(12) United States Patent
George et al.

(10) Patent No.: US 7,042,833 B1
(45) Date of Patent: May 9, 2006

(54) MODEM TRANSMISSION OVER PACKET NETWORKS

(75) Inventors: Ted George, Germantown, MD (US); Erhan Guven, Rockville, MD (US); Frank Edward Fruth, Gaithersburg, MD (US)

(73) Assignee: Texas Instruments Incorporated, Dallas, TX (US)

( * ) Notice: Subject to any disclaimer, the term of this patent is extended or adjusted under 35 U.S.C. 154(b) by 1031 days.

(21) Appl. No.: 09/722,588

(22) Filed: Nov. 28, 2000

(51) Int. Cl.
*G01R 31/08* (2006.01)

(52) U.S. Cl. ............. 370/216; 370/352; 370/389; 370/474; 714/746

(58) Field of Classification Search ........ 370/352–356, 370/216, 394, 389, 474; 714/746, 752, 725, 714/753, 755
See application file for complete search history.

(56) References Cited

U.S. PATENT DOCUMENTS 6,145,109 A * 11/2000 Schuster et al. ............ 714/752
6,438,105 B1 * 8/2002 Qarni et al. ................ 370/231
6,549,587 B1 * 4/2003 Li ............................. 375/326
6,757,250 B1 * 6/2004 Fayad et al. ............. 370/235.1

FOREIGN PATENT DOCUMENTS

GB 2255877 A 11/1992
WO 98/58492 12/1998

* cited by examiner

*Primary Examiner*—Ricky Q. Ngo
*Assistant Examiner*—Nittaya Juntima
(74) *Attorney, Agent, or Firm*—Abdul Zindani; Wade James Brady, III; Frederick J. Telecky, Jr.

(57) ABSTRACT

A system for transmitting modem signals across a packet network with improved resistance to bursty network packet loss that includes a first and a second processor, which connect a first and second V.32 and above modem to a first and a second side of the packet network and which provide a modified V.42 error correction using a Link Access Procedure for Modems (LAPM). The first and second processors provide a local interface to the V.32 and above modems, demodulate a first and second data stream from the corresponding V.32 modems into bits, packetize the bits for transport over the packet network according to an Internet Protocol (IP), and remodulate data streams received from a remote end. The modified V.42 error correction includes a staggered redundancy of packet data, in which the staggered redundancy attaches data from a packet $n_1$ to a subsequent packet $n_L$, where $L>2$.

10 Claims, 3 Drawing Sheets

| $n_1$ | $n_2$ | $n_3$ | $n_4$ | $n_5$ | $n_6$ | $n_7$ | $n_8$ | ... | ... | ... | $n_i$ |
|---|---|---|---|---|---|---|---|---|---|---|---|

FIGURE 4

| | | | |—Lost Packet—| | | | | | | |
| | | | | Burst | | | | | | | |
|---|---|---|---|---|---|---|---|---|---|---|---|
| $n_1$ | $n_2$ | $n_3$ | $n_4$ | $n_5$ | $n_6$ | $n_7$ | $n_8$ | $n_9$ | $n_{10}$ | $n_{11}$ | $n_{12}$ |
| $n_{1R}$ | $n_{2R}$ | $n_{3R}$ | $n_{4R}$ | $n_{5R}$ | $n_{6R}$ | $n_{7R}$ | $n_{8R}$ | $n_{9R}$ | $n_{10R}$ | $n_{11R}$ | |

FIGURE 5

PRIOR ART

|—Lost Packet—| Delay |—Recovery—|

| $n_1$ | $n_2$ | $n_3$ | $n_4$ | $n_5$ | $n_6$ | $n_7$ | $n_8$ | $n_9$ | $n_{10}$ | $n_{11}$ | $n_{12}$ |
|---|---|---|---|---|---|---|---|---|---|---|---|
| | | | | | $n_{1R}$ | $n_{2R}$ | $n_{3R}$ | $n_{4R}$ | $n_{5R}$ | $n_{6R}$ | $n_{7R}$ |

|———Stagger L———|

FIGURE 6

|———Lost Packet———|———Recovery———|
| | Burst | | |

| $n_1$ | $n_2$ | $n_3$ | $n_4$ | $n_5$ | $n_6$ | $n_7$ | $n_8$ | $n_9$ | $n_{10}$ | $n_{11}$ |
|---|---|---|---|---|---|---|---|---|---|---|
| | | | | | $n_{1R}$ | $n_{2R}$ | $n_{3R}$ | $n_{4R}$ | $n_{5R}$ | $n_{6R}$ | $n_{7R}$ |

|———Stagger L———|

Unrecovered packets

FIGURE 7

MODEM TRANSMISSION OVER PACKET NETWORKS

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to modem transmission over packet networks. In particular, the present invention relates to techniques for demodulating, relaying, and remodulating modem transmissions over packet networks. Presently, the common approach for modem transmission over a packet network is using packetized G.711 data.

When modem devices are connected through a packet network, they are not directly connected. The entire modem signal is packetized at a sending end, sent over the packet network and reassembled into a designated format at the receiving end before presentation to the receiving modem device.

For example, packetizing and transportation of modem calls over gateway platforms using G.711 (PCM) codec, requires digitizing the originating modem phone line at 64 Kbps, packetizing and transporting the entire 64 kbps data stream to the other side, and then sending out the same 64 kbps data stream to the remote modem. The advantage of this approach is that it works for any modem that can be received on a standard POTS phone line, and it is simple to implement.

The disadvantage of this approach are:

(1) it requires a large amount of network bandwidth to implement the call and a connection can be dropped because of packet loss. If G.711 packets are being sent every 10 mSec, then the network bandwidth required to send each direction of the call is over 110 kbps (when the header sizes (RTP+UDP+IP+TCP+Ethernet) are included).

(2) The connection over a packet network is not a constant connection and often experiences line delays, errors, jitter and/or packet loss which can result in modem errors. In particular, packet loss results in interruptions in the modem signal (intermittent carrier loss) at the receiving modem. The interruptions result in degraded data throughput due to modem retrains and increased modem connection failures.

(3) Due to the clock differences at the two end points, standard G.711 playout techniques will periodically exhibit a modem signal interruption due to playout overruns and/or underruns. Again these interruptions in the modem signal lead to periodic modem retrains impacting data throughput rates.

In summary, when G.711 coding with packetization is used for data modem transmissions, the two modems are essentially communicating to each other using a potentially inadequate medium for their transmission. This approach is particularly vulnerable to network packet loss.

BRIEF SUMMARY OF THE INVENTION

The modem relay of the present invention allows for the capability to demodulate, relay, and remodulate modem transmissions over packet networks.

The modem relay provides a local interface to the modem on both ends of the call, demodulates a data steam, packetizes the bits for transport over an IP network, and remodulates the data steam at the remote end. the modem relay provides bandwith savings, and improved performance (data throughput and connection reliability) in a packet loss environment.

The modem relay mitigates the problems associated with using G.711 to send modem traffic. In modem relay, the physical layer or link layer of the modem signal is terminated locally for both ends of the call. Only the demodulated data stream is sent over the network. This leads to dramatic bandwidth savings. For a V.34 modem, in an exemplary embodiment, the 64 kbps phone line is demodulated into a maximum of 33,600 bps data stream. That data stream is packetized and transported with a network bandwidth of less than 20 kbps (for 30 mSec packets).

Since the physical layer is terminated locally, network packet loss will not result in any interruption in the modem signal at the receiving modem. Therefore this approach will eliminate connection failures due to the network packet loss. Instead a packet loss will result in an error in the information data stream.

Bandwidth savings are also realized using Modem Relay in that data is carried over the IP network only as the modem transmits data. When the modem is not transmitting data, no packets are sent on the IP network. In contrast, continuous 64 kbps packetization takes place when using G.711 to carry modem traffic. Depending on the network transport, the modem data is sent over the packet network using a guaranteed delivery mechanism (link layer termination) or sent using a non-guaranteed delivery mechanism (physical layer termination). In the case of a non-guaranteed delivery mechanism, data redundancy techniques can be used to combat packet loss and improve data throughput.

The present invention also teaches a staggered redundancy technique for improving packet transmission performance in a packet loss environment in order to ensure modem transmission integrity, to minimize implementation complexity and maintain high channel density and to minimize the loss associated with burst packet loss with minimal increase in bandwidth requirements.

In a uniformly distributed packet loss environment, it could be argued that single (N=1) redundancy is an effective and acceptable approach to ensuring good modem integrity. This approach offers simplicity while having comparable network bandwidth increases compared to other more complicated forward error correction techniques. The basis for this conclusion lies in the fact that in a uniformly distributed packet loss environment, the majority of packet loss events will have a length of one lost packet. Simple single redundancy will therefore correct a majority of the packet loss events leading to improved data throughput.

However, the uniformly distributed packet loss model is not the best model for packet loss. Rather, the packet loss tends to be bursty in a packet network. In this case, the simple single redundancy technique still offers improvement over the no protection case, but is not as effective as in a uniformly distributed packet loss model. Increasing the amount of redundancy, i.e. increasing the value of N, to improve burst loss protection is unattractive because of the network bandwidth penalty associated with it.

The present invention teaches an alternative to the simple single redundancy. The redundancy is maintained at a single redundancy, but improves lost packet performance while minimizing network bandwidth requirements by staggering the redundancy. Instead of attaching a data payload from the previous network packet to the current packet, the data payload from the L-th previous network packet is attached to the current packet. In essence, two data paths over the packet network separated in time (L) are created to combat burst packet losses on the channel. L equal to one, coincides with the existing simple single redundancy method.

The staggered redundancy approach offers the advantages of the simple single redundancy technique. The staggered redundancy does not require an increase in bandwidth. The staggered redundancy does not require increased implementation complexity, and provides the same protection performance in a uniformly distributed packet loss environment. However, the present invention offers additional protection in instances of burst packet loss were a series of packets are lost. Simple single redundancy does not provide recovery in burst loss of packets. The stagger number L is selected to be greater than the number of packets in the series lost in the burst, so that the lost packets can be recovered after the burst.

The staggered technique taught herein will delay recovery over a single redundancy, because recovery cannot begin until after the delay stagger time L.

BRIEF DESCRIPTION OF THE DRAWINGS

FIG. 4 is a diagram illustrating a series of packets in a packet network transmission.

FIG. 5 is a diagram illustrating a series of packets in a packet network transmission with a simple single redundancy.

FIG. 6 is a diagram illustrating a series of packets in a packet network transmission with a staggered redundancy as taught in the present invention.

FIG. 7 is a second diagram illustrating a series of packets in a packet network transmission with a staggered redundancy as taught in the present invention.

DETAILED DESCRIPTION OF THE INVENTION

The modem relay for V.22bis modems and below occurs at the physical layer. The modem's physical layer is demodulated into a bitstream and that bitstream is relayed end-to-end across the network. Any higher layer protocols (error correction, compensation) that may be present are passed end-to-end across the network. This approach works well for low speed modems. However, V.32 modems and other high speed modems rely on the use of higher-layer protocols to streamline and improve the accuracy of data transmissions.

Error correction is the first protocol to be added on top of the raw modem bitstream. For example, the ITU standard for error correction is V.42. Error correction provides a mechanism for two modems to:
 1) detect errors by transmitting data frames and using CRC's to detect framing errors;
 2) correct errors by automatically retransmitting data: and
 3) flow control data transmissions through the use of start-stop data.

Since almost all high speed modems support V.42 LAPM processing, the present invention implements modem relay for faster modems at the link layer and not the physical layer. This means that the gateway on each side of the modem relay connection will terminate the LAPM protocol for its local modem connection.

A gateway-to-gateway LAPM protocol is implemented over the network to achieve error correction and flow control between the two gateways. Compression and any application layer protocols will continue to run end-to-end across the link, except that both modems will be forced to use the same type of compression format.

There are several benefits to implementing modem relay at the link-layer:
 1) the modems on both sides can be trained to the best possible local data rate;
 2) the modem connection does not have to be negotiated across the network;
 3) errors can be corrected through retransmission rather than data redundancy;
 4) network delays and packet loss do not adversely impact data relay.

Figure 1:
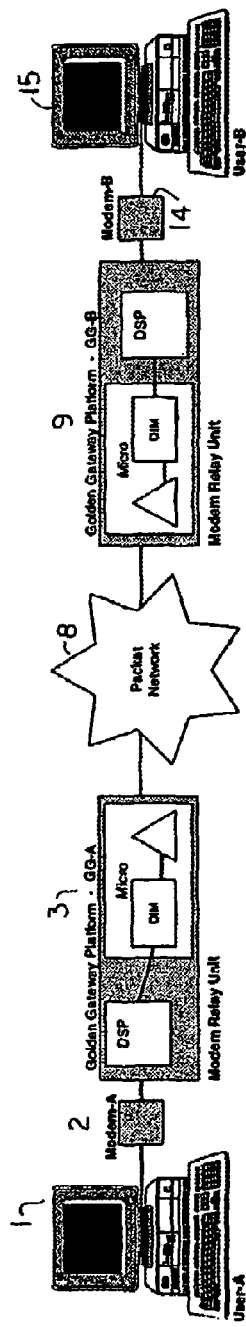
FIG. 1 is a diagram illustrating the components of a modem relay configuration.

A typical modem relay system configuration of an exemplary embodiment of the present invention is illustrated in FIG. 1. Sending a modem relay call includes the following steps:

1) A first user, initiates a modem call using a dial-up modem, such as modem 2 attached to a personal computer 1 at the first end of the connection.

2) Modem 2, enters an off-hook state, dials and waits for the far end modem 14 to answer.

3) the first gateway 3 detects the line seizure, opens a DSP voice channel and collects DTMF digits.

4) The first gateway 3 translates the dial number and attempts to perform a call setup to the far end gateway 9 which is located at a remote point in the network.

5) Gateway 9 detects the incoming call setup from gateway 3 over the packet network 8. The gateway 9 accepts the incoming call and opens a DSP voice channel to handle the incoming call. Next, gateway 9 seizes the outgoing line.

6) for modem relay, the outgoing line connects to modem 14 at the far end which may be connected to a personal computer 15 or may be a modem in a modem pool. Modem 14 goes off-hook and plays a modem answer sequence (eg. V.25 ANS tone).

7) gateway 3 detects the modems answer sequence (as described below) and switches the DSP over from a voice channel to a modem relay channel. Then gateway 9 sends the switch over message to gateway 3 in the form of a modem relay message packet. Gateway 9 also continues to negotiate with far end modem 14 to establish a data connection to PC 15.

8) gateway 3 switches its channel to modem relay and begins to negotiate channel setup with modem 2.

9) during the negotiations, control messages are exchanged between gateway 3 and gateway 9 to coordinate the compression format used on both sides of the link and to establish the gateway to gateway LAPM link. At the end of the negotiation, both modems have connected with their respective local gateway at the best possible connection rate using V.42 LAPM and the same type of compression. Further, the modems on both sides have transitioned into data mode and are ready to begin sending or receiving data.

10) modem 2 and modem 14 now begin sending data back and forth across the packet network 8. Each gateway unit demodulates the modem transmissions, packetizes the data and sends it to the far side. The gateway on the far side remodulates the modem data and sends it to the far end modem. Throughout the connection, flow control is performed on each segment of the link to regulate the error free transmission of data.

11) the connection continues until one of the modems hangs up. At that point, the call is terminated on both sides and the channels then return to idle.

Figure 2:
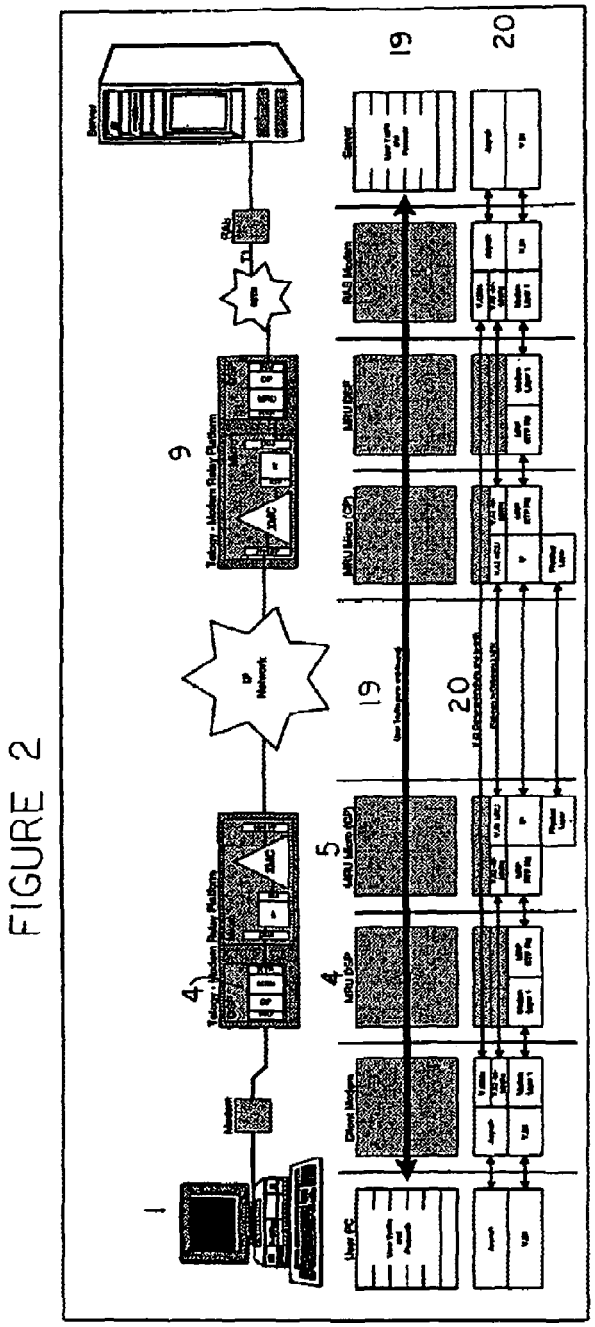
FIG. 2 is a diagram illustrating the functional components of a modem relay operation.

The connection architecture for the exemplary embodiment of a link layer modem relay of the present invention is illustrated in FIG. 2. The physical connections between the modems, gateways and network are the same as for data layer modem relay (described above). The difference occurs in the processing performed by the microprocessor on the LAPM layers of the communication.

For V.32 modems and above, V.43 LAPM error correction is commonly used to provide link layer connectivity and error correction between the modem end points. For link layer modem relay, the LAPM layer is terminated locally for each modem.

When LAPM is terminated locally, the modem relay controller of the present invention uses elements in the LAPM protocol to control the data flow between the two end points. This allows either side to be connected independently of the other (data rates and modulation types do not have to be the same on both sides). Using LAPM simplifies the issues and timing problems associated with modem negotiation and call establishment.

All forms of modem compression will be passed end-to-end. However, since the link layer is terminated locally, the compression format must be negotiated locally and then passed end-to-end. Therefore, the gateways have to force both sides to use the same type of compression protocol, using the defaults set at the gateways.

In the diagram of FIG. 2, the user traffic 19 and compression protocols 20 are run end-to-end across the network 8. The MRU DSP 4 terminates in the modem layer-1 (physical layer) on both sides and passes the data up to the microprocessor software. The MRU microprocessor 5 terminates the link layer, initiating a new LAPM link to connect with the far end gateway 9, packetizes the modem transmission into RTP packets and sends the packets to the remote gateway 9.

The gateway LAPM protocol supports: redundant data and ARQ; configurable single packet redundant data; cyclical redundancy checks for error detection; automatic retransmission if the redundant data does not suffice to recover lost packets and flow control across the link.

There is currently no network protocol standard defining the call control or data transmission protocol for modem relay over packet networks. Therefore, a proprietary approach is utilized by the present invention to implement modem relay. However, the present invention can be implemented with a standard protocol without departing from the scope of the inventive concepts taught herein. The protocol is similar to the proprietary fax relay protocol disclosed in co-pending application Ser. No. 09/031,047. The modem relay protocol used accommodates encapsulation using the RTP format for transmission across the network.

The modem relay protocol has the following features:

Retransmission of lost packets. The gateway to gateway LAPM link monitors the packets that are sent and received across the network. Each packet has a sequence number and CRC. Any packets that are found to contain framing errors are retransmitted automatically.

Redundant data. FIG. 5. Data redundancy is achieved by appending data from previous packets in the payload section of the current data packet. Then, the receiving gateway uses the packet sequence number to determine if there has been a packet loss. If no packet loss occurred, it uses the most recent data field in the packet. If the receiving gateway detects that packet loss has occurred, the data fields for lost packets are retrieved by reading further down in the current packet.

Staggered Redundancy. FIG. 6. With staggered redundancy, the redundant data is not attached to the immediately succeeding packet, the redundancy is staggered whereby the redundant data is appended to a later packet with one or more intervening packets. Staggered redundancy allows for data recovery of several sequential packets are lost, however the delay in recovery is increased.

Retraining is also accommodated by the present invention. In the event that one of the modems in the connection experiences a loss of equalization on the line, it can initiate a retrain signal. Since the modem connection is handled by the gateway port modem termination DSP module, the retraining event is completely handled within the DSP. Any resulting data backups or flow control issues are resolved using the gateway-to-gateway LAPM. Since the modems on either side are connected independently, it is not a problem if the modem needing to retrain experiences a speed shift to a lower rate (including rates commonly supported by data layer modem relay). If the compression format or V.42 LAPM error correction are lost as a result of retraining, the call will be terminated, but otherwise the data exchange will continue as though it had not been interrupted.

Figure 3:
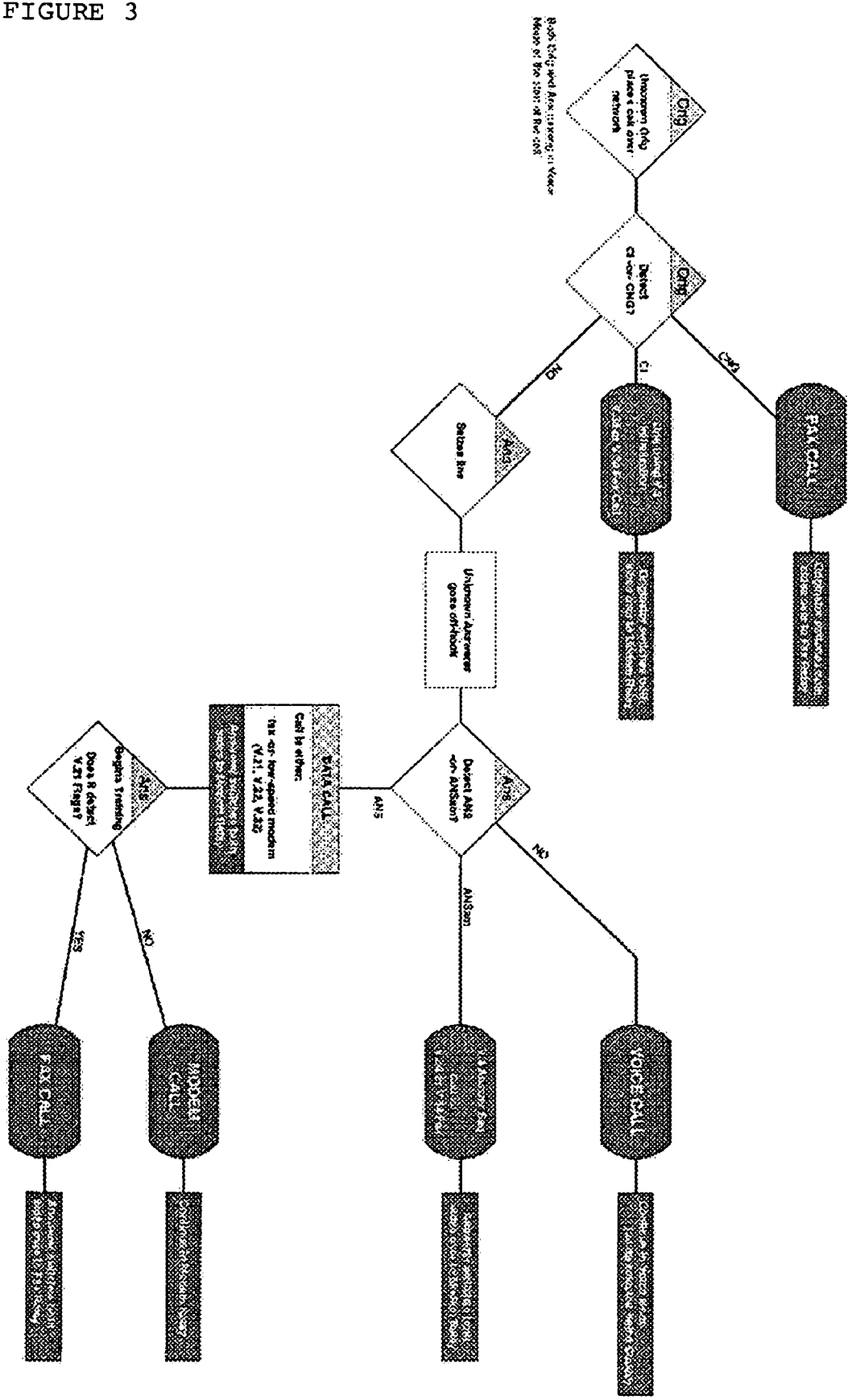
FIG. 3 is a logic diagram illustrating the logical structure of a modem relay.

Call discrimination is accomplished through processing in the DSP. When a call is connected, the gateway must determine what type of call processing is required to successfully implement the call, voice, fax relay, modem relay, or PCM. Individual channels can be pre-configured for a certain type of processing, but in general the gateway does not know in advance what type of devices are going to be involved in the call. The earlier it can distinguish the type of traffic involved in a call, the faster it can switch over to use the right set of processing resources. FIG. 3 illustrates an exemplary decision tree for determining the processing sequence for new calls.

The exemplary embodiment of the present invention, illustrated in FIG. 3, includes processing for discrimination of CNG, CI, ANSam, ANS and voice codecs.

CNG is an optional tone put out by calling facsimile machines. Not all fax machines use it, but if it is present on the calling side it indicates that the call is definitely a fax call. If the originating gateway detects this tone, then it will switch both sides to fax relay.

CI is an optional event put out by calling V.90, V.34 and V.34 fax capable modems. It is not always present, but when it is present on the originating side, the receiving gateway will detect the presence of CI and switch over to link layer modem relay processing.

ANSam is the V.8 answer tone, and is used by V.90, V.34 and V.34 fax capable modems. When present on the answering side, the gateway will switch over to link layer modem relay.

ANS is the V.25 answer tone, and is used by V.32, V.22 and V.21 modems and by fax machines. When detected on the answering side, the gateway will switch to modem relay processing. If modem relay later determines that the call is a fax call, the gateway will switch over to fax relay.

If none of the other events are detected, the gateway will continue to process the call using the preconfigured voice codec.

FIG. 4 illustrates a series of packets $n_1$ through $n_i$ in a packet network. The packets are transmitted in series with no redundancy. In the event of loss of even a single packet, the lost packet cannot be recovered.

FIG. 5 illustrates the same packet series as FIG. 4, however, data from each of the packets is repeated in the next frame in a single simple redundancy technique. With this technique, if a single packet is lost, for example packet $n_3$, the lost data from packet $n_3$ can be recovered during transmission of the next packet $n_4$.

FIG. 6 illustrates the same packet series as FIGS. 4 and 5. Just as in FIG. 5, data from each packet is repeated a single time later in the transmission series. However, unlike FIG. 5, the repetition is not connected with the next immediate frame but is staggered several frames, as taught in the present invention. In the exemplary embodiments for FIG. 6, the stagger L is five packets. This means that data from packet $n_1$ is repeated at packet $n_6$, and data from packet $n_2$ is repeated at packet $n_7$. This stagger is continued for the packet series.

With the stagger of FIG. 6, if a single packet, for example $n_3$ is lost, the lost data from the packet can be recovered during the transmission of packet $n_8$. The stagger will add a delay to the recovery, necessitating buffering of the intermediate packets and a delay of the image data until the loser packet is recovered. The buffering and delay can be accomplished without significant increase in signal processing and will only be present for a short interval to recover from packet loss.

If a number of packets in series are lost, such as with a lost packet burst, only the data from the last packet in the series can be recovered with the simple single redundancy technique illustrated in FIG. 5. For example, if data from packets $n_3$, $n_4$ and $n_5$ are lost, redundant data from packets $n_{2R}$, $n_{3R}$ and $n_{4R}$ will also be lost. Therefore, data from packets $n_3$ and $n_4$ cannot be recovered. Only data from packet $n_5$ will be recovered during the transmission of packet $n_5$.

With the technique taught in the present invention if a number of packets in series are lost, such as with a lost packet burst, all of the packets in the series can be recovered if the stagger L is greater than the lost burst length. If the lost burst length is greater than the stagger L, the number of recoverable packets will be equal to the stagger L.

For example, in FIG. 6, if data from packets $n_3$, $n_4$ and $n_5$ are lost, each of the data from these packets will be recovered after delay D, during the transmission of packets $n_8$, $n_9$ and $n_{10}$ respectively. Because the burst loss B was only three packets and the stagger L was five packets, all data from the lost packets can be recovered.

If the burst loss B is greater than the stagger L, as illustrated in FIG. 7, not all of the data from the lost packets can be recovered after delay. Because the burst loss overloads the stagger, data from packets $n_{1R}$ and $n_{2R}$ are also lost and therefore data from $n_1$ and $n_2$ cannot be recovered. Because increased stagger will cause greater delay and decreased stagger will provide less protection against longer burst loss, implementation of the present invention requires a balance between stagger and packet loss consideration for optimal implementation.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

We claim:

1. A system for transmitting modem signals across a packet network with improved resistance to bursty network packet loss, comprising:

a first processor that connects a first V.32 and above modem to a first side of said packet network and provides a modified V.42 error correction using a Link Access Procedure for Modems (LAPM), wherein said first processor provides a local interface to said V.32 and above first modem, demodulates a first data stream from said V.32 and above first modem into bits, packetizes the bits for transport over the packet network according to an Internet Protocol (IP), and remodulates a second data stream received from a remote end, and said modified V.42 error correction includes a staggered redundancy of packet data, said staggered redundancy attaching only data from a single packet $n_1$ to a subsequent packet $n_{1+L}$, where 2<L<6.

2. The system for transmitting modem signals of claim 1, further comprising:

a second processor that connects a second V.32 and above modem to a second side of said packet network and provides a modified V.42 error correction using a Link Access Procedure for Modems (LAPM), wherein said second processor provides a local interface to said V.32 and above second modem, demodulates a third data stream from said V.32 and above second modem into bits, packetizes the bits for transport over the packet network according to an Internet Protocol (IP), and remodulates a fourth data stream received from said first end, and said modified V.42 error correction includes a staggered redundancy of packet data, said staggered redundancy attaching data from a single packet $n_1$ to a subsequent packet $n_{1+L}$, where 2<L<6.

3. The system for transmitting modem signals of claim 2, wherein:

said first processor terminates said LAPM protocol for said first modem;

said second processor terminates said LAPM protocol for said second modem; and said first and second processors establish a gateway-to-gateway LAPM protocol across said packet network for error correction and flow control.

4. The system for transmitting modem signals of claim 2, wherein 2<L<6 to provide acceptable delay.

5. A method for packet loss recovery from bursty packet loss in a packet network, comprising:

providing a series of packets, including packets $n_1$ to $n_i$, to a packet network, each of said packets, $n_1$ to $n_i$, including data corresponding to an order 1 to i, wherein i is a positive integer and not equal to 1; and attaching only said data corresponding to said order 1 to i to packets $n_{1+L}$ to $n_{i+L}$ of said series of packets, where 2<L<6.

6. The method of claim 5, wherein said packets include packetized modem data.

7. The method of claim 5, wherein 2<L<6 accommodates expected packet loss and provides acceptable delay.

8. A method for transmitting modem signals across a packet network with improved resistance to bursty network packet loss, comprising:

receiving a modem signal having a control portion and a data portion, from said first modem;

separating said control portion from said data portion;
providing a control signal to said first modem as a local interface;
packetizing said data portion for transmission over said packet network to a second modem;
providing a series of packets, including packets $n_1$ to $n_i$, to a packet network, each of said packets, $n_1$ to $n_i$, including data corresponding to an order 1 to i, wherein i is a positive integer and not equal to 1; and
attaching only said data corresponding to said order 1 to i, to packets, $n_{1+L}$ to $n_{i+L}$, of said series of packets, where $2<L<6$.

9. The method of claim 8, wherein said packets include packetized modem data.

10. The method of claim 8, wherein $2<L<6$ accommodates expected packet loss and provides acceptable delay.

* * * * *